United States Patent [19]

Jaworek

[11] 3,763,879

[45] Oct. 9, 1973

[54] COMBINATION COLUMN

[75] Inventor: Dieter Jaworek, Tutzing, Upper Bavaria, Germany

[73] Assignee: Boehringer Mannheim GmbH, Mannheim, Germany

[22] Filed: Feb. 18, 1971

[21] Appl. No.: 116,581

[30] Foreign Application Priority Data
Feb. 23, 1970 Germany................... P 20 08 354.9

[52] U.S. Cl.................. 137/268, 210/232, 210/266, 210/282, 137/550
[51] Int. Cl............................................ B01d 35/28
[58] Field of Search................... 137/268, 271, 269, 137/550, 544, 545; 210/314, 266, 282, 232

[56] References Cited
UNITED STATES PATENTS

| | | | |
|---|---|---|---|
| 1,927,228 | 9/1933 | Compton | 210/314 X |
| 3,360,128 | 12/1967 | Federline | 210/232 X |
| 3,522,884 | 8/1970 | Frost | 210/232 |
| 1,075,433 | 10/1913 | Milner | 137/545 X |
| 3,297,260 | 1/1967 | Barlow | 137/550 X |
| 984,082 | 2/1911 | Edgerton | 137/550 X |
| 2,819,799 | 1/1958 | Wilkerson | 137/550 X |
| 868,022 | 10/1907 | Shafer | 137/550 X |
| 1,239,267 | 9/1917 | Groves | 137/544 X |
| 3,407,841 | 10/1968 | Semon | 137/550 X |

Primary Examiner—Henry T. Klinksiek
Assistant Examiner—Robert J. Miller
Attorney—Burgess, Dinklage & Sprung

[57] ABSTRACT

Combination columns comprised of individual connective parts, some of which may contain sieve means and other means, provide flexible and adaptive systems for effecting chemical processes such as column chromatography and involving carrier-bound reagents.

3 Claims, 7 Drawing Figures

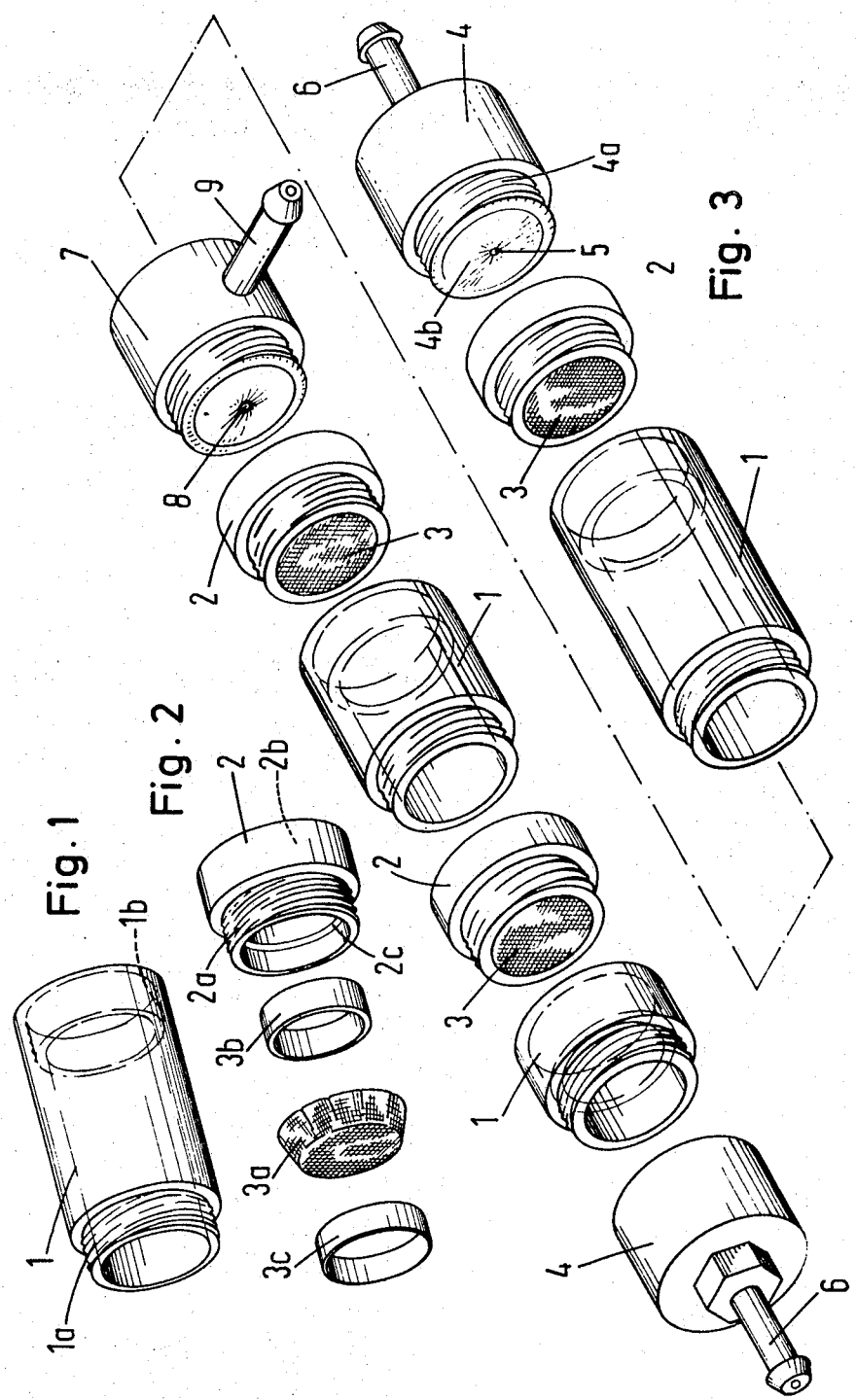

INVENTOR
DIETER JAWOREK
BY
BURGESS, DINKLAGE & SPRUNG
ATTORNEYS.

COMBINATION COLUMN

The present invention is concerned with a combination, or composite, column which is especially useful for a large variety of purposes in chemical technology, especially in column chromatography and the like.

Due to recent developments in chemical technology, for example in chromatography, and in the use of carrier-bound reagents, such as carrier-bound proteins and enzymes, the columns previously used have proved to be too lacking in adaptability.

The present invention provides a combination column made up of certain individual parts which can be connected together in any desired manner and which, in the simplest manner, can be adapted to the most varied possibilities of use and, in particular, permits the combination of several chemical separation or reaction steps in a single column.

The combination column according to the present invention comprises at least one cylindrical column segment provided with threads on both ends, as well as at least one separation piece which is also provided with threads on both ends and in which a sieve is incorporated and/or at least one end piece provided with a thread, the individual parts being screwed together in any desired manner.

All the parts of the combination column according to the present invention are preferably made from synthetic resin which is expediently transparent.

The column segments preferably have different lengths which bear a definite relationship to one another. Thus, for example, in the case of a column with a diameter of about 2 cm and comprising a plurality of column segments, column segments can be provided with lengths of 1, 2, 4 and 8 cm so that, by appropriate assembly of the individual column segments, it is possible to make up a column of any desired length.

The column segments preferably have an external thread on one end and a corresponding internal thread on the other end. However, in the case of columns of small diameter, it is preferable that the threads on both ends are external, the connection of the individual column segments being obtained by means of connection pieces provided with internal threads at each end.

The separation pieces are similar to short column segments but contain a sieve. The sieve is preferably set into the separation piece in such a manner that it terminates one of the two ends of the separation piece. The sieve is also preferably inserted in such a manner that it can be exchanged so that sieves of different fineness can, as desired, be inserted.

The end pieces are preferably of massive construction and provided with a thread on at least one end with which they can be screwed onto a column segment or onto a separation piece. The end pieces are provided with bores which can terminate externally in a nipple. This nipple can also be constructed in such a manner that it can be screwed into position so that it can easily be removed and can, if desired, be replaced by another nipple provided with a stopcock. The end of the end piece provided with a thread is preferably countersunk somewhat in the direction of the opening of the bore in order to promote a uniform running out of liquid from the column.

The combination column according to the present invention can also be provided with massive intermediate pieces. A massive intermediate piece of this type is provided with a thread on both ends and can thus be screwed onto other column parts. It is provided with an axial bore which is preferably narrow so that the volume of liquid which can be contained therein is as small as possible. The bore can be provided with at least one branch leading to the outside, this branch preferably terminating in a nipple which can be provided with a stopcock. Both ends of the intermediate piece are countersunk somewhat in the direction of the bore opening in the same manner as the above-mentioned one end of the end piece.

According to one construction, the intermediate piece is provided with two branch bores and a four-way stopcock. In this way, it is possible to lead away to the outside, at certain points of the column, the liquid contained therein either wholly or partially and to return it, optionally with addition liquid and/or reagents, into the following column segment.

The combination column according to the present invention is capable of an extremely large number of variations. Thus, for example, by simply screwing together column segments and closure pieces, it is possible to construct columns of any desired but precisely defined length and of precisely defined column volume for any desired purpose. If, on the ends of a column assembled from one or more column segments, there are screwed on separation pieces, then there is obtained a sieve cage open at both ends in which can be placed, for example carrier-bound proteins. The filled sieve cage can then be introduced into a liquid in the manner of a tea egg for bringing about the corresponding reaction and can, when desired, again be removed therefrom.

When used in this manner, the combination column according to the present invention is expediently also provided with control pieces in the form of a column segment, one end of which is cut at an angle and the other straight end of which is threaded. The obliquely cut end of the control piece preferably has an angle of about 40° to 50° to the cylindrical axis. The thread of the straight end can be provided with a counter nut ring.

For carrying out a reaction with the use of a sieve cage of the above-described type in a comparatively large volume of liquid, both ends of the sieve cage are preferably provided with control pieces. One of the control pieces, which is provided with a counter nut ring, is adjusted with regard to the other control piece in such a manner that both oblique openings are directed towards the same side. If, now, the combination column constructed in this manner as a "sieve cage" is rotated in a liquid, then the surrounding liquid flows through the combination column and the desired reaction, for example an enzymatic reaction, can take place.

For the rotation of the column, there is preferably provided a magnet ring which can be screwed on or off. This can consist of a fixedly clampable ring which is pushed over the column and firmly clamped into position, this ring being provided with a stirrer magnet which, in the usual manner, rotates the column in conjunction with a magnetic stirrer present outside of the vessel.

The threads of the individual parts of the combination column according to the presetn invention are preferably provided with sealing rings in order to prevent leakage of liquid when the column is in use.

A better understanding of the present invention and of several embodiments thereof, may be had by reference to the accompanying drawings in which:

FIG. 1 is a perspective illustration of one column segment;

FIG. 2 is a perspective and exploded illustration of a separation piece comprising a sieve and sieve-holding means;

FIG. 3 is a perspective and exploded illustration of a combination column comprising three separate chambers and a T-piece;

Figure 4:
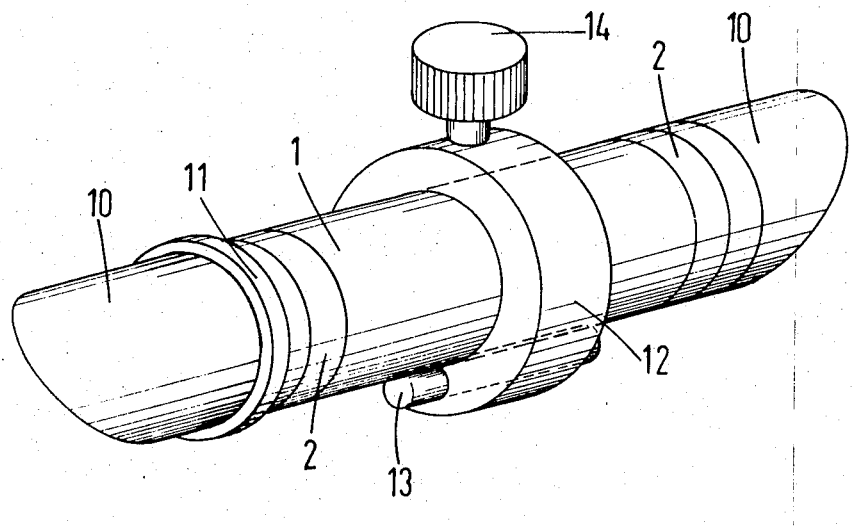
FIG. 4 is a perspective illustration of a combination column constructed as a sieve cage provided with control pieces and a magnet ring.

More specifically, FIG. 1 shows a column segment 1 with an external thread 1a and an internal thread 1b. Instead of the internal thread 1b, the column segment can also carry a second external thread 1a. In the latter case, the individual column segments cannot be screwed together directly but require the help of short connecting pieces provided with appropriate threads.

FIG. 2 shows a separation piece 2 which has been broken up into its component parts. The separation piece body 2 corresponds substantially to a short column segment and possesses an external thread 2a and an internal thread at the other end (not illustrated). A sieve 3 placed in the separation piece body 2 consists of the actual sieve piece 3a, which is held by an inner ring 3b and an outer ring 3c and can be inserted into one end of the body of separation piece 2 and is secured on a stop 2c against axial displacement.

FIG. 3 shows the individual parts of a multi-chamber column according to the present invention. Three column segments 1 of different length, together with three separation pieces 2 provided with sieves 3, two end pieces 4 and an intermediate piece 7, constitute a column with three separate chambers in which can be placed solid materials which may be the same or different. Such solid materials can be, for example, exchangers, carrier-bound enzymes, molecular sieve substances or combinations thereof. The end pieces 4 are provided with a thread 4a at one end and have a bore 5, the other end terminating in a nipple 6. The inner end 4b of the end piece 4 is countersunk somewhat in the direction of the bore 5. The massive intermediate piece 7 has an axial bore 8. A branching of the bore in the manner of a T-piece terminates in a nipple 9. The intermediate piece 7 also has internal and external threads and the two end surfaces thereof are countersunk somewhat in the direction of the bore 8 in the same manner as in the end pieces 4.

FIG. 4 shows a combination column according to the present invention assembled in the manner of a sieve cage. Both ends of a column segment 1 carry separation pieces 2 (sieve 3 is not shown). The separation pieces 2 carry, in turn, control pieces 10. By means of a counter nut ring 11, one of the control pieces is adjusted in such a manner that the oblique outer end is brought in correspondence with the direction of the other control piece. A synthetic resin ring 12, in which is mounted a stirrer magnet 13, is firmly clamped onto the column segment 1 by means of a screw 14.

When the column combination illustrated in FIG. 4 is placed in a liquid container which stands upon a magnetic stirrer, then the column combination is caused to rotate by the magnet 13 and, by means of the control pieces 10, in the case of suitable adjustment, a stream of liquid is caused to pass through the column.

It will be readily appreciated that the combination columns according to the present invention can be adapted to a large variety of different uses. Thus, for example, column segments with separation pieces 2 can, when they are of suitable diameter, be placed in centrifuge glasses for centrifuging off gels, the gel being retained by the sieve 3 but the liquid being centrifuged off. The desired depth of insertion into the centrifuge beaker can be achieved, for example, by screwing up the counter nut ring 11 on a column segment 1. Combined columns of the type illustrated in FIG. 3 can be used for the sequential analysis of proteins, for example, by placing identical or different enzymes bound to solid carriers in the column and passing the protein to be analyzed through the filled column. By the appropriate provision of separation pieces 3 or of intermediate pieces 7, it is possible to ascertain at any desired point which amino acids or oligopeptides have been split off by the continuing action of the proteolytic enzymes. Thus, the progress of the protein fission can be followed in a very simple manner without the fission itself being disturbed or inhibited in any way. Another possibility is the combination of the reaction and the analysis in one column; in a first column section, a particular reaction is allowed to take place and in a second column section a dissolved reagent is introduced by means of an intermediate piece 7 so that a direct determination can take place of the reaction occurring in column segment 1.

Numerous other possibilities of using the combination column according to the present invention will be readily apparent. Thus, for example, a clamp ring can be provided which can be drawn over the column segments and separation pieces and clamping on of dialysis membranes, filter papers, sieve pieces or the like thus made possible. From a column segment 1 and a ring 12 with magnet 13, there can thus be constructed a magnetically movable dialysis device in the simplest possible manner by clamping a dialysis membrane onto both ends. The clamping ring thereby consists expediently of an inwardly open U-profile, the internal diameter of which corresponds to the external diameter of the column segments and separation pieces, and of a rubber ring placed inside the U which projects somewhat inwardly. The U-profile is made of a rigid material, for example, of a synthetic resin.

Figure 5:
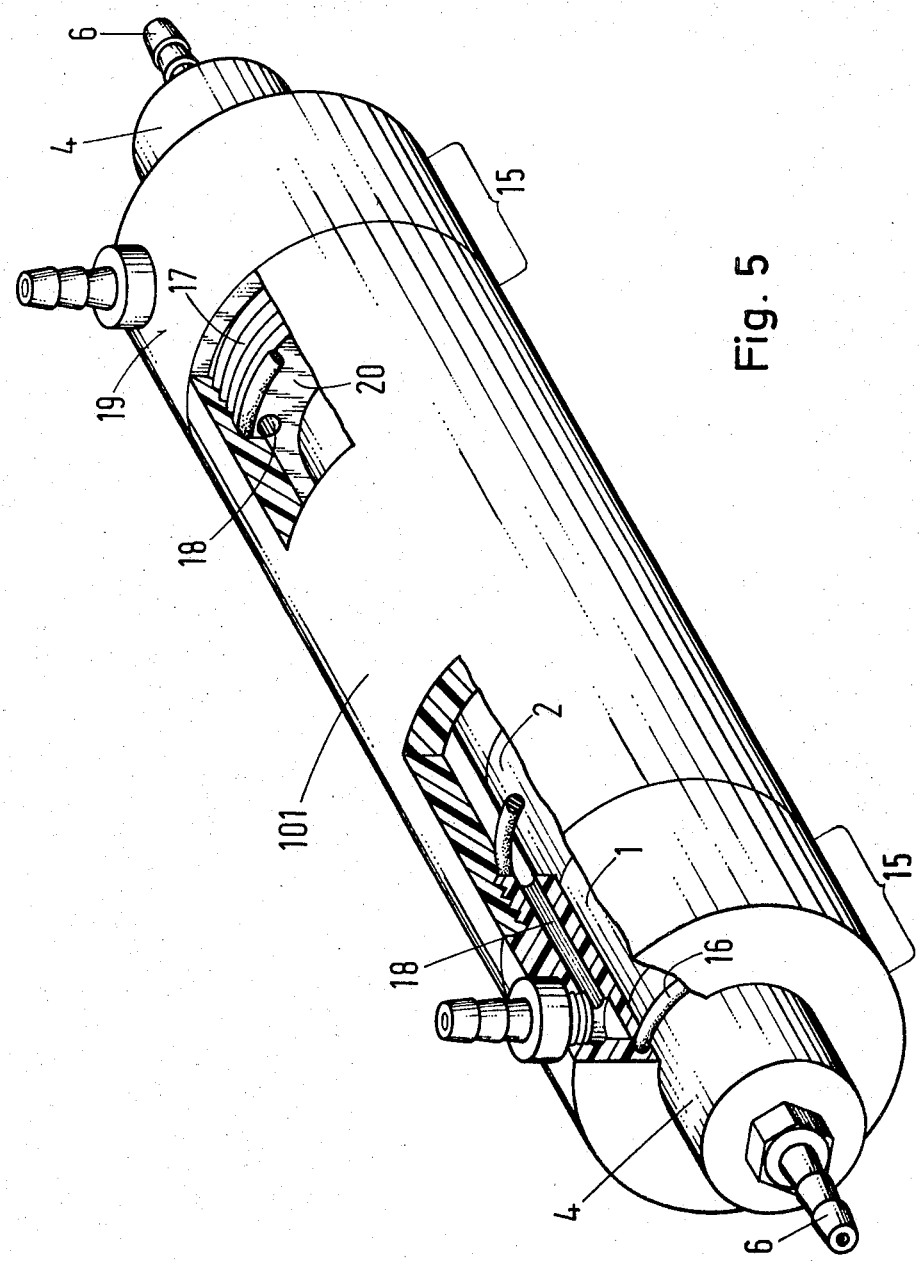
FIG. 5 is a partially sectional and perspective illustration of a combination column provided with a temperature regulating element consisting of two clamp rings and a column segment of comparatively large diameter.

According to a further embodiment, the clamping ring can have on at least the outer end a thread suitable for screwing onto a further column segment of greater diameter and a bore which connects the ring outer end with the ring end face bounding onto the thread so that, by means of two clamping rings and a column segment of comparatively large diameter, there can be constructed a temperature-regulation mantle. A combination column with such a temperature-regulating mantle is illustrated in FIG. 5. A combination column with column segments 1 and closure parts 4 carries a heating or cooling mantle which consists of two clamping rings 15 and a column segment 101 which has a greater diameter than the column segment 1. The cut-away clamping ring shows a rubber ring 16 placed in an inwardly open U-profile, which ring 16 firmly holds the clamping ring 15 on the combination column and acts as a seal. The outside of the clamping ring 15 is provided with a thread 17 by means of which it is screwed onto the column segment 101. A bore 18 connects the outside of the ring 19 with the ring end face 20 bordering onto the thread. Through the bores 18 there can be introduced and removed a cooling or heating medium, for example water, into and from the annular space between the column segments 1 and 101. The openings on the outside of the ring 19 of the bores 18 are expediently provided with nipples.

Figure 6:
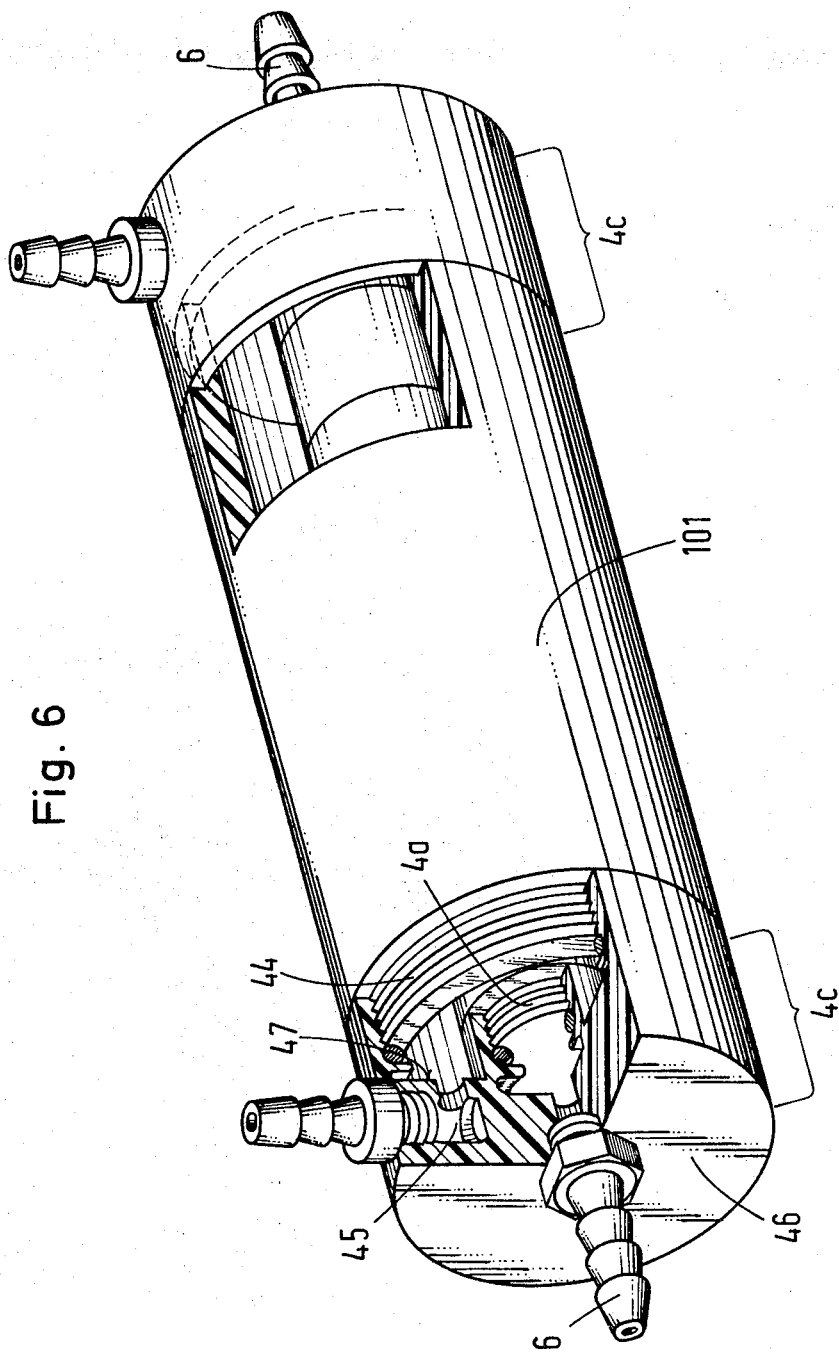
FIG. 6 is another embodiment of a combination column with a temperature-regulating mantle.

FIG. 6 shows a further embodiment of a combination column according to the present invention with a temperature-regulating mantle. In this case, the closure parts 4 are constructed in such a manner that they hold the temperature-regulating mantle and permit the inflow and outflow of the temperature-regulating medium. The closure part 4 has a larger diameter than the column segment 1 and, apart from thread 4a for screwing onto the column segment 1, has a further thread 44 with a larger diameter which is suitable for screwing onto a column segment 101. In FIG. 6, this thread is illustrated as an internal thread but it can also be constructed as an external thread. A bore 45 connects the outer side 46 of the closure part with the annular surface between the threads 4a and 44. There is thus obtained a column which has a temperature-regulating mantle over its whole length. As in the case of FIG. 5, a heating or cooling agent can be passed in and out through the bores 45 provided with nipples.

Figure 7:
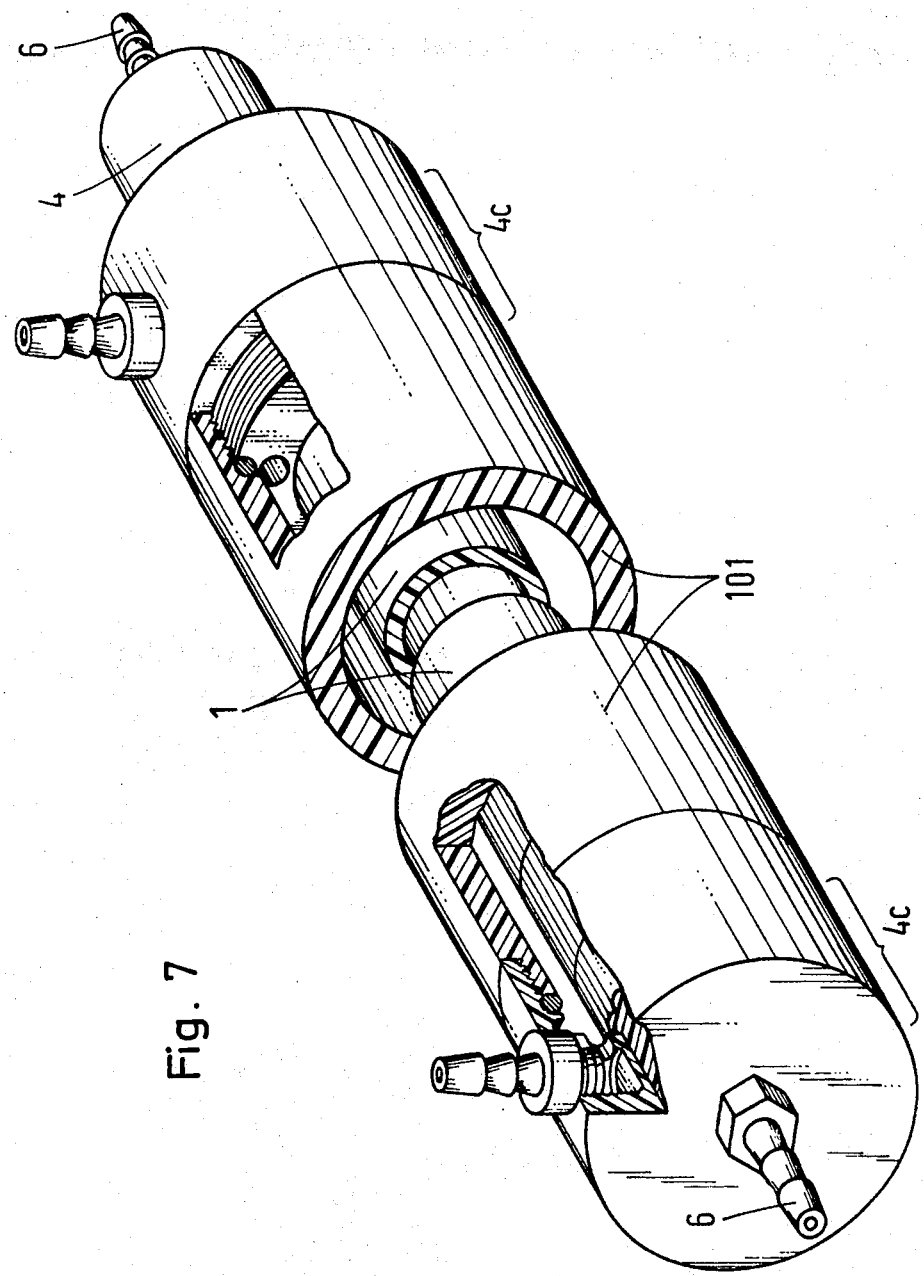
FIG. 7 is a further embodiment of a combination column with a temperature-regulating mantle.

FIG. 7 shows another embodiment of the combination column with a temperature-regulating mantle, this mantle being formed by the combination of a closure part 4 as described in FIG. 6 with a clamping ring according to FIG. 5 and a column segment 101. This Figure clearly shows the many possibilities of alteration and adaptation which can be achieved by suitable combination of the constructional parts of the column according to the present invention.

It will be understood that the specification and examples are illustrative but not limitative of the present invention and that other embodiments within the spirit and scope of the invention will suggest themselves to those skilled in the art.

What is claimed is:

1. Combination column for effecting chemical processes comprising at least one hollow cylindrical column segment with threads on both ends, at least one hollow cylindrical threaded separating piece containing sieve means transversely disposed at one end thereof and at least one threaded end piece, the said segments and pieces having a common axis and being of substantially the same internal diameter and being screwed together in desired combination.

2. Column as claimed in claim 1 wherein there is more than one of said column segments and these column segments are of different length in defined length relationship to each other.

3. Column as claimed in claim 1 wherein said sieve means in said cylindrical separating piece lies substantially in the same plane as one of the ends of said separation piece.

* * * * *